(12) United States Patent
Kocinec et al.

(10) Patent No.: US 6,680,100 B1
(45) Date of Patent: Jan. 20, 2004

(54) STITCHED SEAM FOR MEDICAL TAPE

(75) Inventors: James A. Kocinec, Lynchburg, VA (US); Richard S. Simonson, Rustburg, VA (US); G. Lewis Best, III, Lynchburg, VA (US); William J. Dilanni, Altavista, VA (US)

(73) Assignee: Burllington Industries, Inc., Greensboro, NC (US)

( * ) Notice: Subject to any disclaimer, the term of this patent is extended or adjusted under 35 U.S.C. 154(b) by 42 days.

(21) Appl. No.: 09/718,091

(22) Filed: Nov. 22, 2000

(51) Int. Cl.[7] ................................................. B32B 3/06
(52) U.S. Cl. ........................... 428/102; 428/58; 428/61; 2/275
(58) Field of Search ........................... 428/102, 58, 61; 2/275

(56) References Cited

U.S. PATENT DOCUMENTS

| | | | |
|---|---|---|---|
| 5,125,995 A | 6/1992 | D'Hasse et al. | 156/155 |
| 5,162,149 A | 11/1992 | Reaney | 428/315.5 |
| 5,270,111 A | 12/1993 | D'Hasse et al. | 428/356 |
| 5,445,874 A | 8/1995 | Shehata | 428/252 |
| 5,698,307 A | 12/1997 | Levy | 428/316.6 |

OTHER PUBLICATIONS

Bostik Product Data 300 Film Adhesives, 1999.

*Primary Examiner*—Harold Pyon
*Assistant Examiner*—Jane Rhee
(74) *Attorney, Agent, or Firm*—Nixon & Vanderhye

(57) ABSTRACT

A garment has a particular stitched seam that very effectively cooperates with a seam sealing tape to provide an effective and long lasting seal at the seam. First and second portions of the fabric are joined together by a stitched seam comprising a 300 class stitch with Top stitch, using about Tex 30 or smaller thread, and the seam sealing tape seals the stitched seam. The thread may comprise a polyester continuous filament sewing thread size Tex 30–10, with about 8–10 stitches per inch. The 300 class stitch may comprise a plain stitch, and the stitched seam may comprise a superimposed seam. The seam is readily produced using either a Single or Double Lockstitch Machine which contains one or two needles, one or two hooks, and one or two bobbins, respectively. The sealing tape may comprise a first layer of a dimensionally stable heat reflecting film having a heat reflecting surface, a second layer bonded to the first layer and comprising an uncured thermosetting polyurethane or polyester adhesive having a thickness between about 0.5 to 12 mils, and a fabric adhesively bonded to the heat reflecting surface.

16 Claims, 1 Drawing Sheet

STITCHED SEAM FOR MEDICAL TAPE

BACKGROUND AND SUMMARY OF THE INVENTION

In co-pending application Ser. No. 09/542,933 filed Apr. 4, 2000 (the disclosure of which is hereby incorporated by reference herein), a highly advantageous sealed waterproof seam for garments is described which is particularly useful for garments such as surgeons' gowns, some articles of outerwear, fire fighters' turnout jackets, and garments used in the military or industries where chemical and/or heat resistance are required. The particular seam sealing tape described in the co-pending application was described as used with stitched seams in general, and has great utility for a wide variety of stitched seams. However it has been found according to the invention that the particular stitching of the seam is a result effective variable, and a greatly improved end product can be provided if the stitched seam has a particular construction and/or is made in a particular manner. By using the particular seam according to the present invention a lower profile for the seam is provided, and less stitches per inch may be utilized, and also smaller thread can be utilized, while providing a garment having comparable or enhanced functionality, including the level of waterproofness of the sealed seam.

The particular seam according to the present invention is provided in garments in general, such as the garments described above, but is particularly suited for use in garments where there is seam sealing tape that seals the stitched seam. The garments can be made according to the invention using commercially available equipment, such as a Lockstitch Machine which contains one needle, a hook, and a bobbin. A Double Needle Lockstitch Machine which contains two needles and two hooks and bobbins, can be used as well, although such equipment is not normally used in production on a regular basis.

According to one aspect of the present invention a garment is provided comprising: First and second fabric portions joined together by a stitched seam. The stitched seam comprising a 300 class stitch with Top stitch, using about Tex 30 or smaller thread. And, seam sealing tape sealing the stitched seam.

Preferably the thread comprises a polyester continuous filament sewing thread, e.g. Tex 30–10 size thread. The stitched seam preferably comprises about 6–12 (most preferably about 8–10) stitches per inch. A 300 class stitch is a stitch classification according to a U.S. government reference manual, Federal Standard 751a (FS751a) and which manual defines and categorizes seams, stitches and stitching. The 300 class stitch may comprise a plain stitch (301) (also called a lock stitch or single needle stitch). The 300 class stitch is therefore a specific type of stitch formed by a lock stitch sewing machine. The stitched seam may comprise a superimposed seam (SS) with a Top stitch.

The sealing tape utilized in the garment according to the present invention may comprise a conventional sealing tape, but most desirably is a sealing tape described in co-pending application Ser. No. 09/542,933, the disclosure of which has been hereby incorporated by reference herein. For example the sealing tape may comprise a first layer comprising a dimensionally stable heat reflecting film; and a second layer bonded to the first layer and comprising an uncured thermosetting polyurethane or polyester adhesive having a thickness between about 0.5 to 12 mils. For example the first layer of the tape may comprise a heat reflecting surface, and the tape may further comprise a third layer comprising a polyester tricot or woven polyester fabric (e.g. having a weight of between about 0.7–2.5 ounces per square yard) adhesively bonded to the heat reflecting surface. The tape first layer may comprise a film consisting essentially of polyurethane, silicone, or vinyl, for example the first layer may comprise a polyurethane microporous film having a thickness of between about 25–60 microns.

According to another aspect of the present invention there is provided a method of making a garment from fabric having first and second portions, comprising: a) Placing the first and second portions of the fabric in proper juxtaposition with respect to each other. b) Using a sewing machine and Tex 30 or smaller sewing thread, stitching a 300 class stitch, with top stitch, seam at the juxtapositioned portions of the fabric. And, c) sealing the stitched seam produced by b) using seam sealing tape.

Preferably in the practice of the method, b) is practiced using a Lockstitch Machine which contains one needle, a hook, and a bobbin, or a Double Lockstitch Machine. Also preferably in the practice of the method b) is further practiced to produce a stitched seam having about 8–10 stitches per inch. For example in the method b) is further practiced to provide a superimposed seam. Also the method is preferably practiced using the desirable seam sealing tape as described in the co-pending application, in which case c) may be practiced using seam sealing equipment, a laundry press, or iron, applying heat and pressure to a second surface of the garment, opposite a first surface to which the tape is applied, sufficient to thermoset the adhesive but not damage the fabric, so that the adhesive flows into the garment, but not past the film, to form an aesthetic substantially waterproof bond at the seam.

According to another aspect of the present invention there is provided a garment comprising: First and second fabric portions joined together by a stitched seam; and, the stitched seam comprising a superimposed seam 300 class plain stitch with Top stitch, using about Tex 30 or smaller thread and having about 8–10 stitches per inch. The first and second fabric portions may each be an end (properly folded over or otherwise manipulated) of a single piece of fabric, or of separate pieces of fabric.

It is the primary object of the present invention to provide an enhanced stitched seam for a garment, and particularly one that is useful in association with seam sealing tape, and the corresponding method of making a garment. This and other objects of the invention will become clear from an inspection of the detailed description of the invention and from the appended claims.

DETAILED DESCRIPTION OF THE DRAWINGS

Figure 1:
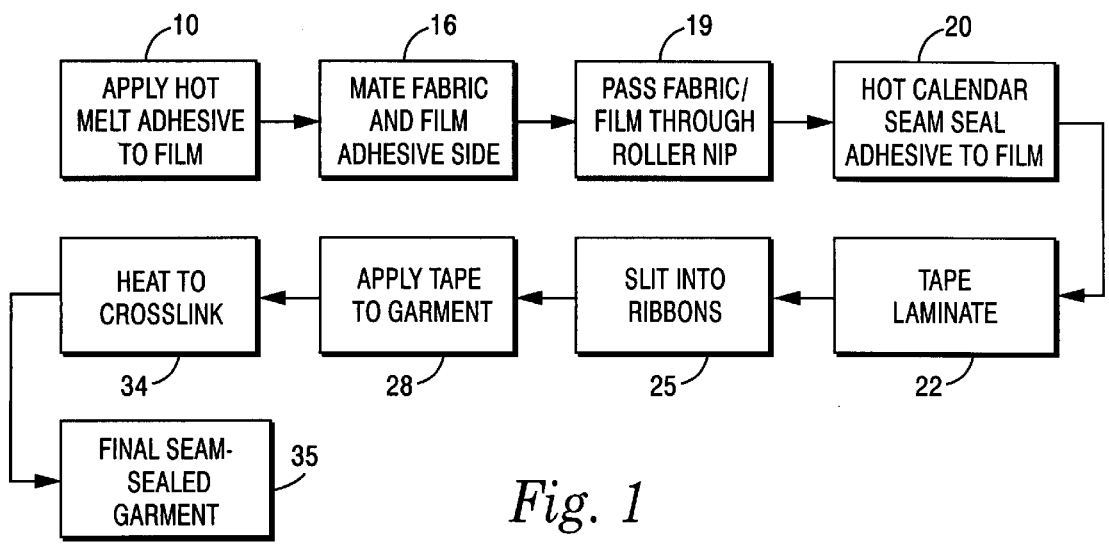
FIG. 1 is a box diagram indicating exemplary method steps that may be utilized in the manufacture and use of garment sealing tapes according to the co-pending application and useful in the method of the invention.
Figure 2:
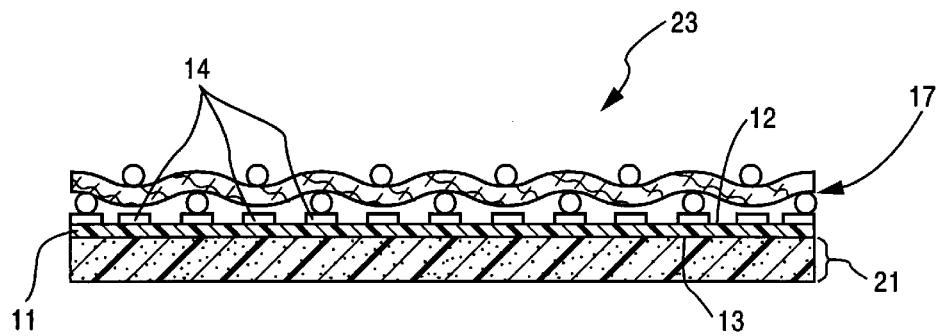
FIG. 2 is a greatly enlarged schematic longitudinal cross-sectional view of an exemplary seam sealing tape produced according to FIG. 1.
Figure 3:
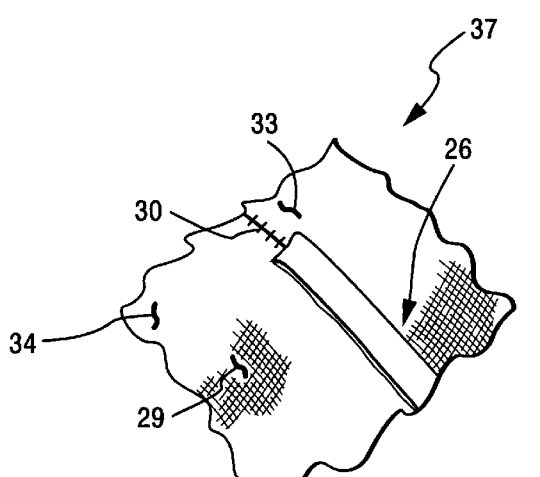
FIG. 3 is a detailed perspective schematic view showing a tape having the construction of FIG. 2 used for sealing a seam according to the invention in a garment.

FIGS. 1 through 3 illustrate the exemplary method that is preferred for making the seam sealing tape that is used with the garment seam according to the present invention, and is described in the co-pending application. The garment seam according to the invention is only illustrated in FIG. 3.

FIG. 1 schematically illustrates an exemplary method that may be practiced to construct an exemplary garment sealing tape that can effectively waterproof a seam in a garment or other fabric product, and in such a way that the tape will maintain its integrity through an extended period of time, for example through at least about 75 (e.g. about 100) autoclave cycles (and associated industrial wash and dry cycles).

The first procedure illustrated schematically at 10 in FIG. 1 is to apply an adhesive to a first surface of a dimensionally stable heat reflective film. One such film is illustrated at 11 in FIG. 2, having a first surface 12 and a second surface 13 substantially opposite the first surface 12. For example the film is preferably an economical film made from a polymer, such as polyurethane, silicone, or a vinyl film. For example one such film may be Flexchem 51™ from Colorite Polymers. Another is a polyurethane microporous film available from Porvair under the trade name "Porelle Membranes" and having a thickness between about 25–60 microns, e.g. about 55 microns or about 30 microns. The film 11 first surface 12 is heat reflective, and it is to that surface that the adhesive 14 is applied.

The adhesive 14 may be selected from a wide variety of adhesives. For example the adhesive may be inherent in the film 11 itself so that the ultimate fabric (to be described) that is applied is adhered directly to the tacky surface 12 of the film 11 itself. Desirably, however, the adhesive 14 is distinct from the film 11 and comprises a hot melt adhesive, for example a hot melt reactive polyurethane adhesive, that is applied to the surface 12 by rotogravure, or a like conventional technique. The adhesive 14 preferably is applied in a discontinuous pattern, although depending upon the adhesive 14 and the film 11 it can be applied in a continuous manner. A discontinuous pattern is illustrated in FIG. 2.

The next procedure 16 in FIG. 1 is to mate the fabric, illustrated schematically at 17 in FIG. 2 and film 11. The fabric 17 is brought into face-to-face contact with the adhesive 14 of the film 11. For example both the film 11 and the fabric 17 are in web form and they are simply directed by powered and/or idling rollers into face-to-face contact with each other.

The fabric 17 may be selected from a wide variety of different fabrics, knit, woven, or in some circumstances even non-woven. Conventional weights that used will be between about 0.7 to 2.5 ounces per square yard. The weight of the fabric 17 will depend upon the particular use and the particular construction. For example to seal a surgeon's gown seam (either in new manufacture or to repair an existing separated or a non-waterproof seam) an approximately 2.25 ounce per square yard polyester tricot (knit) fabric 17 may be utilized. For example the polyester tricot may be made of singles, 40 denier, 30 filament. As another example, to seal an outerwear waterproof garment seam a 0.9 ounce per square yard polyester tricot would be appropriate for the fabric 17. For a fire retardant application, like a firefighter's turnout jacket, an approximately 1.8 ounce per square yard aramid tricot fabric 17 would be applicable (such as Nomex® fiber from DuPont).

Woven fabrics are also eminently suitable for use as the fabric 17 under many circumstances. A woven fabric would be used as the fabric 17 particularly in applications needing higher durability than can be provided by a knit fabric 17. A woven fabric 17 also could be used for patching woven garments so that the patch would not be as noticeable. For example a surgeon's gown made from a plain weave singles, seventy (70) denier, 34 filament polyester fabric would be patched using the same color woven polyester to "blend in" with the rest of the gown. In all cases where practical, a woven fabric 17 of the same color and weave as the fabric that it is to patch would be desirable.

The next procedure 19 in the method of FIG. 1 is to press the mated film 11 and fabric 17 together to adhesively secure (e.g. with the hot melt adhesive 14) the film 11 to the fabric 17. For example this could be done by passing the mated film and fabric through a conventional roller nip.

The next procedure 20 in FIG. 1 is to apply an uncured thermosetting polyurethane or polyester adhesive, such as the adhesive shown schematically at 21 in FIG. 2, to the second surface 13 of the film 11 to produce a tape/patch laminate, as illustrated schematically at 22 in FIG. 1, and shown schematically at 23 in FIG. 2. Preferably the seam-seal adhesive 21 has a thickness between about 0.5 to 12 mils, the thickness depending upon the particular use desired. For example the optimum thickness for a medical surgeon's gown seam (300 class superimposed (SS) with a Top stitch) would be about 5–11 mils, most preferably about 9 mils, whereas 3 mils may be optimal for a flat seam, and one mil optimal for patches used in repairing a discontinuity in a garment away from the seam.

The preferred seam-seal adhesive 21 is preferably initially thermoplastic and develops thermoset properties when cross-linked by reactants therein. For example a blocked isocyanate is utilized to cross-link the adhesive upon application of heat. There are many commercially available blocked isocyanates along with polyurethanes or polyesters in both solvent and aqueous form that can be used to make adhesive films, such as the seam-seal adhesive 21. Typical application temperatures, which will cause cross-linking/unblocking, are between about 270–400 degrees F. (e.g. about 325–375 degrees F.). One particularly suitable adhesive film utilized as the adhesive 21 is available from Bostik known as a S408–6112. This comprises a thermosetting adhesive film based on a linear saturated polyester polymer having isocyanates that becomes unblocked upon exposure to a temperature of between about 275–400 degrees F. depending upon the pressure and dwell time.

One particularly advantageous way that the procedure 20 of FIG. 1 may be practiced is by using the adhesive 21 in web or film form and laminating it to the film/fabric construction 11/17 in a hot calendering operation using a temperature of between 200–325 degrees F. for a short period of time (e.g. about 240 degrees F. for about 15 seconds). The time and temperature is insufficient to initiate cross-linking in the adhesive 21, but a low level of pressure is highly desirable to improve the lamination, such as the utilization of a belted press, or a heat transfer print machine.

As an alternative to the sequence illustrated in FIG. 1, the adhesive 21 may be applied to the film 11 first, and the fabric 17 applied to the film 11 (as by using hot melt adhesive 14) later.

After production of the tape laminate 23 of FIG. 2, as indicated at 25 in FIG. 1, the laminate 23 is slit into ribbons to produce tape, such as the tape ribbon 26 illustrated in FIG. 3. The procedure 25 is accomplished utilizing conventional slitting and cutting (e.g. die cutting) equipment.

The final tape 26 may be applied to a garment, and then heat and pressure sufficient to unblock the isocyanate in the adhesive 21 applied to cause thermosetting effected. For example in the embodiment of FIG. 3 the tape 26 is applied to the garment 29, such as a surgeon's gown, over the stitched seam 30, with the adhesive 21 in contact with the seam 30. Then sufficient heat and pressure is applied (to the fabric 17 part of the tape 26, or to the opposite side of the garment 29 illustrated in FIG. 3 rather than to the fabric 17 part of the tape 26) to effect cross-linking of the adhesive 21. This procedure may be practiced utilizing a conventional tape sealing machine, laundry press, or iron, such as are common in hospital laundry rooms, and/or an autoclave (to finish curing if the heat in the press, etc., was insufficient), also often commonly used in hospitals.

As a result of a temperature of over about 275 degrees F. applied to the adhesive 21 cross-linking occurs, and the adhesive 21 flows under heat and pressure into the fabric of the garment being sealed, waterproofing it. The film 11 prevents the seam 30 threads from passing through the adhesive layer 21 during this procedure, and also acts as a heat reflective layer increasing the thermal transfer to the adhesive 21 during the seaming operation. The fabric layer 17 adds aesthetics and abrasion resistance to the tape 26. After sufficient heat and pressure have been applied by the seam taping machine, laundry press, or iron, a substantially waterproof bond is formed at the seam 30.

The seam 30 joins together first and second portions 33, 34 of the garment 37 produced, the portions 33, 34 typically, but not necessarily, being end portions (which may be properly folded over or otherwise manipulated to form the desired seam) of a single piece of fabric, or multiple pieces of fabric. The seam 30 according to the present invention preferably comprises a 300 class stitched seam, with Top stitch. The thread for making the seam 30 is about Tex 30 or smaller thread, e.g. Tex 30–10 size thread. Tex is a unit of measurement, i.e., a fiber size, and is the weight in grams of a 1000 meters of fiber. Thus, the preferred thread has a weight of 30–10 grams/1000 meters. A particularly desirable thread is a polyester continuous filament sewing thread, such as a thread from American & Efried Inc. ANEFIL POLY 575789, 16 oz. nominal, Tex 30, White 30001.

The 300 class stitch may comprise a 301 class stitch, commonly referred to as a plain stitch formed with a Lockstitch sewing machine. The seam classification is preferably SS, that is a superimposed seam, although a lapped (LS), bound (BS), edge finish (EF) or even ornamental stitch (OS), seam classification may be possible depending upon the materials. The fabric portions 33, 34 which are joined by the seam 30 preferably are any suitable fabric that is used for the ultimate garment desired, such as a surgeons' gown, fire fighters' turnout jacket, etc., as described above.

The seam 30 that is formed according to the present invention has relatively few stitches per inch yet performs its ultimate function exceptionally well. For example the seam 30 may have about 6–12 stitches per inch, preferably about 8–10 stitches per inch.

The seam 30 may be produced using a double needle or single needle Lockstitch Machine. A particularly desirable sewing machine that can be utilized to produce the stitch 30 is a Lockstitch Machine which contains one needle, a hook, and a bobbin. A Double Needle Lockstitch Machine which contains two needles and two hooks and bobbins, can be used as well, which is commercially available, although not commonly used in production. The smaller the thread the smaller the needle(s) that needs to be used with the sewing machine. For example a Singer size 10 needle with a light ball point or long tapered round point may be utilized for Tex 30 continuous filament sewing thread.

The garment 37 is made by placing the first and second portions 33, 34 of fabric in proper juxtaposition with respect to each other, and using a sewing machine (such as the Lockstitch Machine described above) and Tex 30 or smaller sewing thread, stitching a 300 class stitch, with Top stitch, seam at the juxtapositioned portions of the fabric. Most desirably, according to the present invention, the stitched seam 30 so produced is sealed using seam sealing tape 26. Details of the practice of the seam formation procedure may be to produce the particular detailed seams described above, and the seam tape sealing procedure may be practiced using seam sealing equipment, a laundry press, or iron, applying heat and pressure to a second surface of the garment 37, opposite a first surface to which the tape 26 is applied, sufficient to thermoset the adhesive but not damage the fabric, so that the adhesive flows into the garment 37, but not past the film, to form an aesthetic substantially waterproof bond at the seam 30.

The garment 37 produced according to the invention has enhanced functionality because the seam 30 has a low profile, and less stitches are required per inch, so that cooperation with the seam sealing tape 26 is optimal.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and methods.

What is claimed is:

1. A garment comprising:
   first and second fabric portions joined together by a stitched seam;
   said stitched seam comprising a 300 class stitch with Top stitch, using about Tex 30 or smaller thread; and
   seam sealing tape sealing said stitched seam.

2. A garment as recited in claim 1 wherein said thread comprises a polyester continuous filament sewing thread.

3. A garment as recited in claim 2 wherein said stitched seam comprises about 6–12 stitches per inch.

4. A garment as recited in claim 3 wherein said 300 class stitch comprises a plain stitch.

5. A garment as recited in claim 4 wherein said stitched seam comprises a superimposed seam.

6. A garment as recited in claim 1 wherein said stitched seam comprises about 8–10 stitches per inch.

7. A garment as recited in claim 1 wherein said 300 class stitch comprises a plain stitch.

8. A garment as recited in claim 1 wherein said stitched seam comprises a superimposed seam.

9. A garment as recited in claim 2 wherein said thread comprises Tex 30–10 size thread.

10. A garment as recited in claim 1 wherein said seam sealing tape comprises a first layer comprising a dimensionally stable heat reflecting film; and a second layer bonded to said first layer and comprising an uncured thermosetting polyurethane or polyester adhesive having a thickness between about 0.5 to 12 mils.

11. A garment as recited in claim 10 wherein said first layer of said tape comprises a heat reflecting surface, and wherein said tape further comprises a third layer comprising a fabric adhesively bonded to said heat reflecting surface.

12. A garment as recited in claim 11 wherein said tape first layer comprises a film consisting essentially of polyurethane, silicone, or vinyl.

13. A garment as recited in claim 10 wherein said tape first layer comprises a polyurethane microporous film having a thickness of between about 25–60 microns.

14. A garment as recited in claim 11 wherein said fabric of said tape third layer comprises a polyester tricot or woven polyester having a weight of between about 0.7 to 2.5 oz./sq. yd.

15. A garment comprising:
   first and second fabric portions joined together by a stitched seam; and
   said stitched seam comprising a superimposed seam 300 class plain stitch with Top stitch, using about Tex 30 or smaller thread and having about 8–10 stitches per inch.

16. A garment comprising:
   first and second fabric portions joined together by a stitched seam;
   said stitched seam comprising a 300 class stitch with Top stitch, using about Tex 30 or smaller thread; and
   seam sealing tape sealing said stitched seam;
   said sealing tape including a first layer comprised of a dimensionally stable heat reflecting film; a second layer bonded to said first layer and said fabric portions and stitched seam and comprised of a thermoset polyurethane or polyester adhesive; and a third layer including a fabric adhesively bonded to said heat reflecting film.

* * * * *